INVENTORS
MAURITS TEN BOSCH
DONALD S. BAYLEY
BY
ATTORNEY

Jan. 10, 1967  M. TEN BOSCH ET AL  3,296,872
INERTIAL NAVIGATION SYSTEM
Filed Oct. 4, 1960  9 Sheets-Sheet 5

INVENTORS
MAURITS TEN BOSCH
DONALD S. BAYLEY
BY
ATTORNEY

Jan. 10, 1967  M. TEN BOSCH ET AL  3,296,872
INERTIAL NAVIGATION SYSTEM
Filed Oct. 4, 1960  9 Sheets-Sheet 6

INVENTOR.
MAURITS TEN BOSCH
DONALD S. BAYLEY
BY
ATTORNEY

Jan. 10, 1967 M. TEN BOSCH ET AL 3,296,872
INERTIAL NAVIGATION SYSTEM
Filed Oct. 4, 1960 9 Sheets-Sheet 9

INVENTORS
MAURITS TEN BOSCH
DONALD S. BAYLEY
BY
ATTORNEY

United States Patent Office 3,296,872
Patented Jan. 10, 1967

3,296,872
INERTIAL NAVIGATION SYSTEM
Maurits Ten Bosch, White Plains, and Donald S. Bayley, Bedford Village, N.Y., assignors to M. Ten Bosch, Inc., Pleasantville, N.Y., a corporation of New York
Filed Oct. 4, 1960, Ser. No. 60,336
28 Claims. (Cl. 74—5.34)

The present invention relates to a lightweight inertial navigation system.

It particularly relates to a lightweight inertial navigation system which involves a common platform carrying east-west and north-south vertical gyroscopes as well as east-west and north-south compensating rotors, and in the preferred embodiment also an azimuth or horizontal gyroscope, which platform with said gyroscopes and compensating rotors is enclosed in an essentially spherical shell which is floated in a liquid having a suitable density of about twice that of water.

The present system is in contrast to all other inertial systems in that it does not require large forces to be applied between the sensitive platform carrying the gyroscopes and the base or structure fixed to the vehicle.

In all inertial systems, it is necessary in order to achieve the required accuracy to use the acceleration sensors as null indicators rather than as direct reading devices. This means that a compensating force or moment must be applied to hold the acceleration sensors centered.

This force or moment then becomes the measure of the acceleration rather than the direct output of the accelerometer.

This force or moment must in most systems be applied between the sensitive platform which carries the gyroscopes and the structure which is connected via the gimbals to the vehicle.

This platform is extremely sensitive to the presence of disturbing forces or moments, and it, therefore, must be mounted so that it is disturbed to the least possible extent by the motions of the vehicle.

This required characteristic of the mounting is commonly described as isolation of the sensitive structure from the motion of the base.

In other systems, the required appreciable compensating forces or moments acting between the base and the sensitive structure make it difficult to achieve a very high degree of isolation.

It is among the objects of the present invention as contrasted with all other inertial systems, to eliminate this large compensating force or moment acting between the base and the sensitive elements mounted upon the gyroscope.

It is among the further objects of the present invention to provide an inertial navigational system which may be readily and easily isolated from the motion of the base and in which the usual disturbances are eliminated.

It is a further object of the present invention to provide an inertial navigational system in which the compensating moments or forces act within the instrument rather than between the base and the instrument, and so that the entire instrument will be devoid of influences derived from the motion of the base and will not be affected adversely by compensating moments or forces between the base and the instrument.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, the applicants provide a common platform carrying north-south and east-west gyroscopes and also carrying east-west and north-south compensating rotors.

In the preferred form, the platform also carries an azimuth gyroscope.

The assembly of the three gyroscopes and two compensating rotors enclosed in a spherical shell may be hereinafter referred to as a gyrosphere.

This gyrosphere is floated in a fluorinated or halogenated liquid having a specific gravity of about two.

One action of these three gyroscopes and two compensating rotors in the gyrosphere is to "freeze" all rotational degrees of freedom of movement of the gyrosphere.

The three translational degrees of freedom of movement of the gyrosphere are controlled by means of the electrostatic forces generated by high voltage electrodes placed on a second spherical shell which is close to and completely encloses the spherical shell of the gyrosphere.

This second spherical shell will hereinafter be referred to as the phantom shell.

The phantom shell is mounted in two lightweight gimbals so as to provide three rotational degrees of freedom of motion about a fixed point at the center of the phantom.

The phantom and gimbals are both driven by three servo motors so that the angular orientation of the phantom is held identical to that of the gyrosphere. The previously mentioned electrostatic forces behave like servo motors to hold the center of the gyrosphere in alignment with the center of the phantom.

The gimbals connect the phantom shell to the outer housing of the inertial unit which in turn is fastened to the structure of the vehicle carrying the instrument.

The gimbals and phantom thereby allow continuous motion in azimuth, pitch and roll of the vehicle in respect to the phantom.

This entire structure including the phantom shell, gimbals and the servo motors is located in the flotation fluid. This fluid is sealed inside the outer housing.

The phantom is perforated sufficiently to permit the hydrostatic forces for flotation to act between the gyrosphere and the external housing while at the same time protecting the gyrosphere from all motions of the fluid caused by movement of the gimbals or temperature gradients.

The servo motors, which drive the gimbals and the phantom, are energized by amplified signals from suitable pickoffs which measure the rotary errors in orientation between the phantom and the gyrosphere.

The amplifiers, which supply high voltages to the electrodes on the phantom shell, are energized by the signals from suitable pickoffs which measure the error in translation between the gyrosphere and the phantom shell.

The point of support for the gyrosphere is that point through which passes the resultant of all hydrostatic pressure forces or buoyant forces that act on the gyrosphere.

This point is known as the center of buoyancy and for a perfect sphere is located at its center.

On the other hand, the center of gravity of the gyrosphere is located on a vertical axis, but below the center of buoyancy.

This arrangement makes the gyrosphere pendulous, and the horizontal accelerations of the vehicle, therefore, produce moments around the two horizontal axes of the gyrosphere.

On the other hand, the vertical acceleration does not produce such a moment.

The force necessary to balance the reaction of the gyrosphere to an acceleration is, in the ideal case of neutral buoyancy, completely supplied by the buoyant force.

If there is a departure from neutral buoyancy, small additional forces are supplied by the electrostatic centering system to hold the gyrosphere in translational equilibrium.

The horizontal moment produced by the horizontal acceleration causes one or both of the vertical gyroscopes to precess around their tilting axes.

Suitable pickoffs measure these motions of the gyroscopes and provide signals which when amplified are fed to the motor windings of the compensating rotors. The pickoff in the east-west gyroscope energizes the east-west compensating rotor, and the pickoff in the north-south gyroscope energizes the north-south compensating rotor.

A moment is thus generated which (a) accelerates the compensating rotor and (b) reacts back on the platform to cause the corresponding gyroscope to return to its center position.

In the equilibrium case with the gyroscopes not precessing the moments which accelerate the compensating rotors must be exactly equal and opposite to those produced by the corresponding acceleration components.

The angular acceleration of each compensating rotor is then proportional to the corresponding applied linear acceleration component, and it, therefore, follows that except for the necessary integrating constants, the angular velocity of the compensating rotor is proportional to the linear velocity of the vehicle, and the angular displacement of the compensating rotor is a measure of the displacement of the vehicle.

In other words, each compensating rotor behaves in the first place as a servo motor which holds the corresponding gyroscope centered.

In the second place, each compensating rotor behaves as a double integrator for the input acceleration.

In the third place, the moment which holds the gyroscope centered, that is the moment which holds the acceleration sensing devices at null, is applied via the structure of the platform between the gyroscope and the corresponding compensating rotor rather than being applied via the platform between the gyroscope and any structure fixed to the vehicle.

As mentioned previously, it is this feature of the present invention which greatly increases the degree of isolation from motions of the base as compared with that which can be obtained in other inertial navigation systems.

The gyroscopic stabilizing action of the two vertical gyroscopes and the two compensating rotors prevent any angular displacement of the gyrosphere around its horizontal axes when these accelerations or other disturbances act on the system.

The azimuth gyroscope prevents any angular displacement of the gyrosphere around its vertical axis.

It is in this manner that the rotational degrees of freedom of movement of the gyrosphere are frozen.

In all other inertial navigating systems, the previously mentioned integrating constants are set into an external computer as initial values of velocity and position. In the present invention, however, the initial values of velocity are also set in as initial values of the speeds of the compensating rotors and, in particular, the initial speed of the east-west compensating rotor is set to include the eastward velocity of the earth at the initial latitude.

The present invention then has the following properties:

(a) The resultant angular moment vector of the east-west and north-south compensating rotors becomes and remains parallel to the angular velocity vector of the center of gravity of the vehicle as measured in an inertial, that is, a nonrotating coordinate system.

(b) When the gyrosphere is precessed by energizing torques acting on the vertical gyroscopes, the resulting angular velocity vector of the gyrosphere must equal the previously mentioned angular velocity vector of the vehicle in order to maintain the preferred orientation of the gyrosphere to the local vertical. This forced rotation is hence around the resultant angular momentum vector of the east-west and north-south compensating rotors, and the resultant of the component gyroscopic reaction moments from each compensating rotor is consequently zero.

(c) When the azimuth gyro is precessed to hold the gyrosphere in its preferred alignment with the north direction, gyroscopic reaction moments are developed by this forced rotation at the bearings of the east-west and north-south compensating rotors.

(d) These reaction moments are transmitted via the bearings to the structure of the gyrosphere and are exactly equal and opposite to the moments produced thereon by centripetal and coriolis acceleration components arising from the horizontal motion of the vehicle over the curved and rotating earth.

(e) External computation of, and means for correcting for these centripetal and coriolis acceleration components are, therefore, not required.

The outputs, namely, the speed and number of revolutions of each compensating rotor, therefore, provide all the necessary information required for navigation in a horizontal plane.

The required alignment of the gyrosphere with respect to the local vertical and with respect to the north direction is maintained by using the velocity signals to energize torquers on the gyroscopes themselves, and thereby generate the necessary precession rates.

As compared with other systems, the advantages of the present inertial navigational system are:

(a) The elimination of the requirement for applying large moments or forces between the sensitive platform and the structure affixed to the vehicle has greatly increased the ability to achieve a large degree of isolation from motions of the base.

(b) The integration required to obtain velocity from acceleration and position from velocity is performed by the compensating rotors themselves. External mechanical, electrical or digital integrators for this purpose are, therefore, not required in the present invention.

(c) The moments required to account for the effects of the centripetal and coriolis acceleration components are automatically generated as gyroscopic reactions from the compensating rotors. External computation of, and separate means for applying, these mathematically complex effects as acceleration corrections are, therefore, not required in the present invention.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
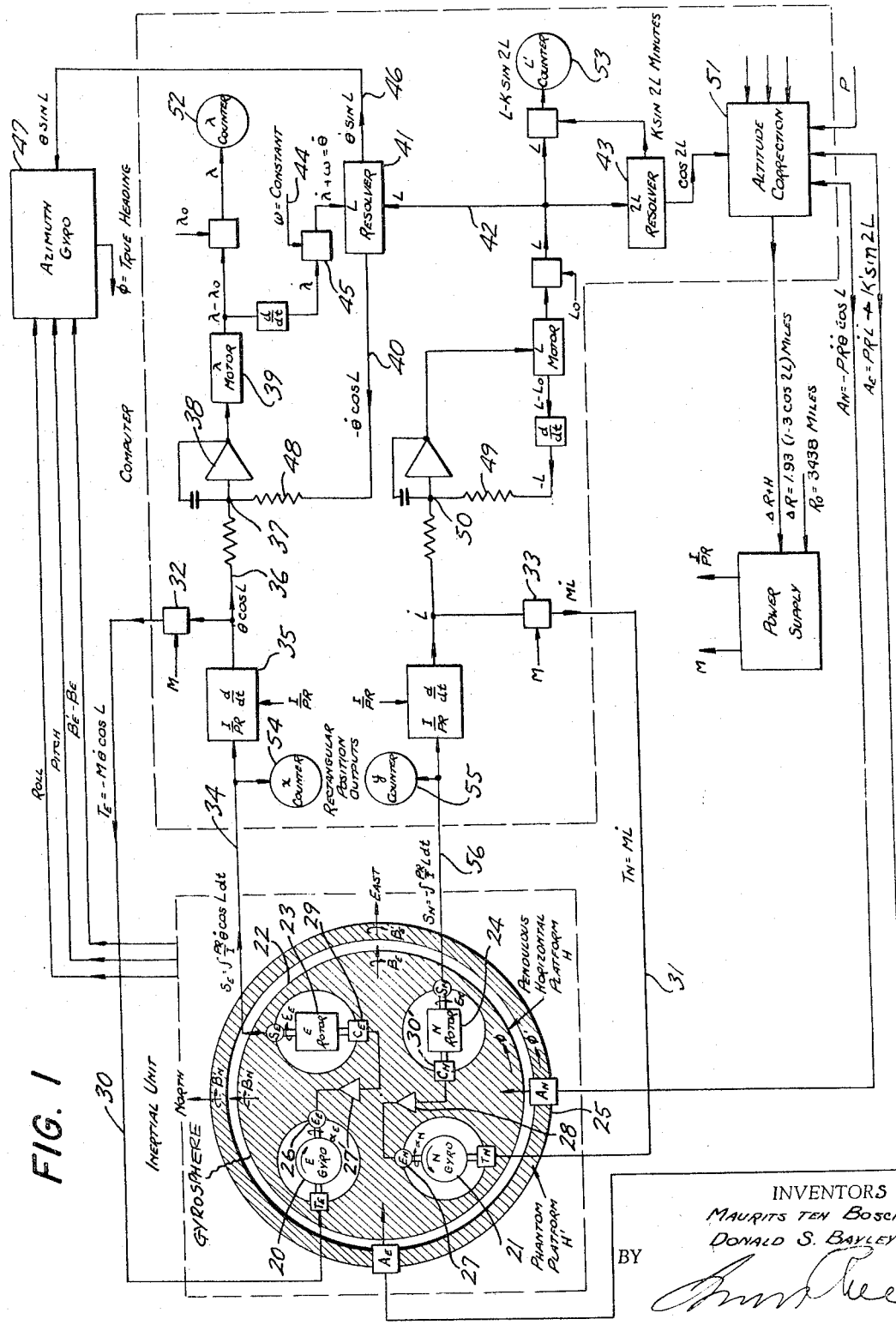
FIG. 1 is a schematic system lay-out of the light weight inertial navigational system of the present invention.

Referring to FIGURE 1 there is shown an east-west gyroscope 20 and a north-south gyroscope 21 each of which have vertical spin axes and which are mounted on a pendulous horizontal platform 22.

Carried on the same platform will be the east-west rotor 23 and the north-south rotor 24 which have horizontal axes at right angles to each other. The pendulous platform 22 is suspended in a phantom platform 25.

The gyroscopes 20 and 21 respectively have the pickoffs 26 and 27 the information from which will be transmitted through the amplifier 28 to energize the rotor windings or field windings 29 and 30', respectively of the rotors 23 and 24.

The pendulous platform 22 will be maintained with its axis directed to the center of the earth with Schuler tuning in connection wtih which the information will be supplied through the line or connection 30a and 31 which in return receive their information from the multiplier units 32 and 33 which multiply the rate of change in latitude by the angular momentum of the vertical gyroscope.

The output from the rotor 23 will be supplied by the line 34 to the differential 35 where the differential value of the east-west information is divided by the distance to the center of the earth resulting in a value equal or proportional to the angular velocity which is the rate of change of longitude plus the rate of the earth's rotation multiplied by the cosine of latitude. As a result, the outgoing information will be the cosine of latitude information which flows through the line 36.

The line 36 extends to a junction point 37. From the junction point 37 information is supplied through the amplifier 38 to the motor 39, the shaft of which is rotated proportional to the rate of change of longitude.

To the junction point 37 will also be supplied cosine of latitude information by the line 40 from the resolver 41. The resolver 41 in turn receives latitude information through the line 42 from the resolver 43.

Further information regarding the rate of the earth's rotation is added through the line 44 to the electrical differential 45.

The information supplied through the line 40 will therefore include both information in respect to the cosine of latitude as well as the angular velocity due to change of longitude or the earth's rate of rotation.

From the resolver 41 information will be supplied through the line 46 to the azimuth gyroscope which output will keep the azimuth gyroscope 47 precessed to point north at all times.

The resistances 48 and 49 feed electrical information to the junction points 37 and 50 which is equal and opposite to the rate of change of latitude and is proportional to the speed of the motor shaft with the result that the number of rotations of the motor shaft will be proportional to the change in latitude.

The altitude correction device 51 will correct for the oblateness of the earth and the altitude above the surface of the earth, the oblateness of the earth being about twelve to thirteen miles at the equator.

It will be noted that there is a longitude counter 52, a latitude counter 53, and to give rectangular position outputs there will be an $x$ counter 54 and a $y$ counter 55 which are positioned upon the lines 34 and 56 respectively.

Figure 2:
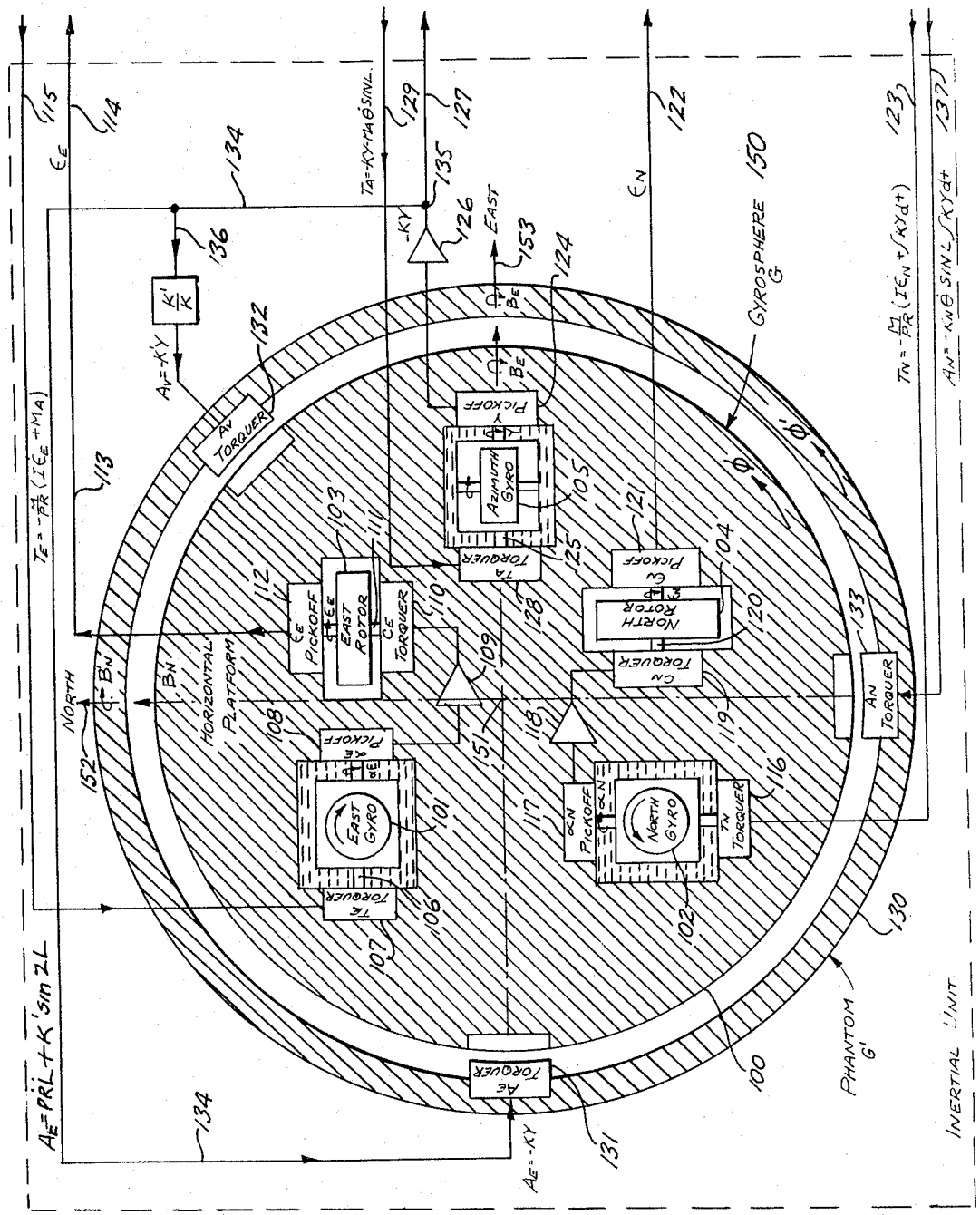
FIG. 2 is a modification of the inertial unit of FIG. 1, showing floating east-west and north-south gyroscopes, together with an east-west rotor and a north-south rotor, together with a floating azimuth gyroscope associated with a pendulous horizontal platform.
Figure 2A:
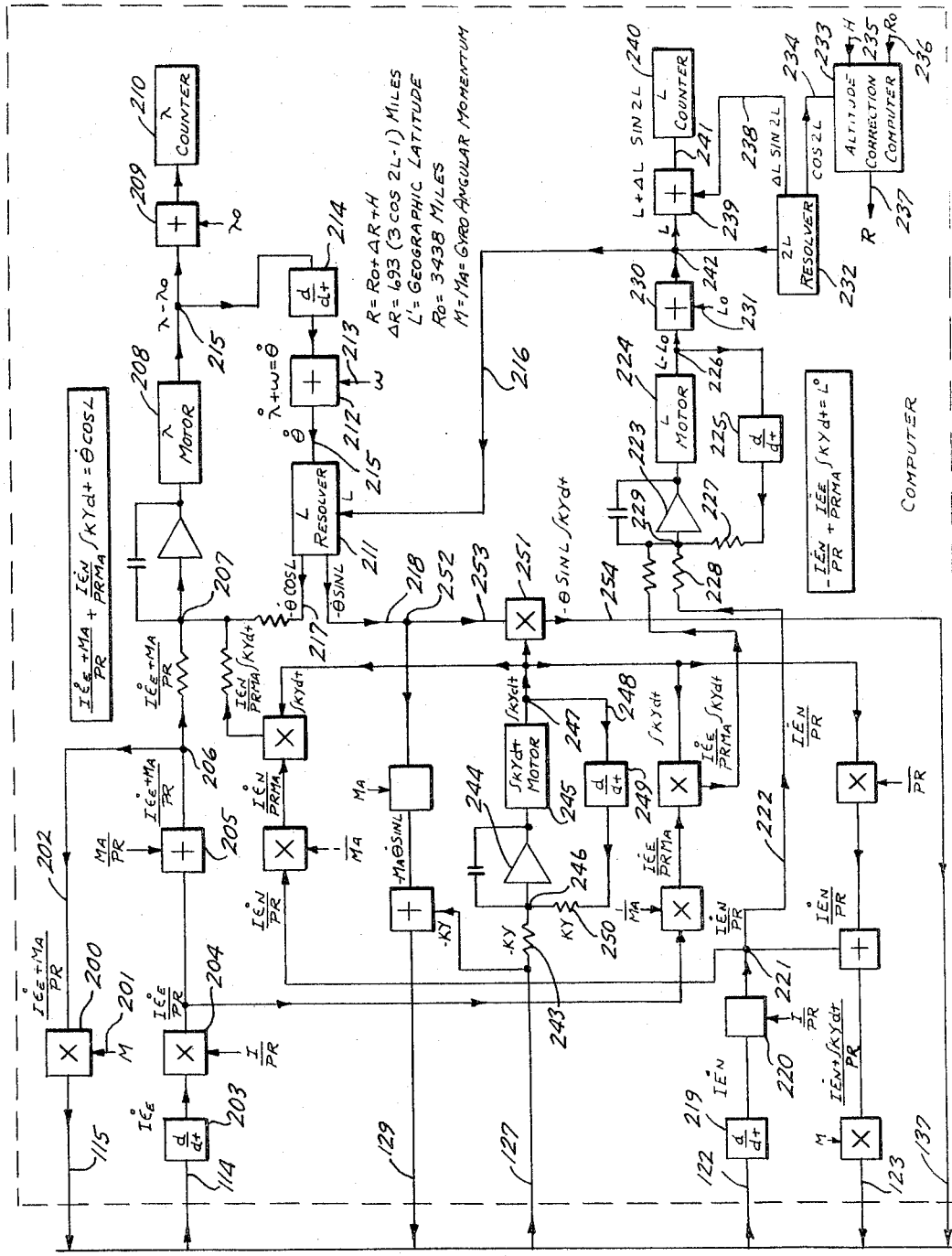
FIG. 2a is a diagrammatic lay-out of the associated computer circuit.
Figure 3:
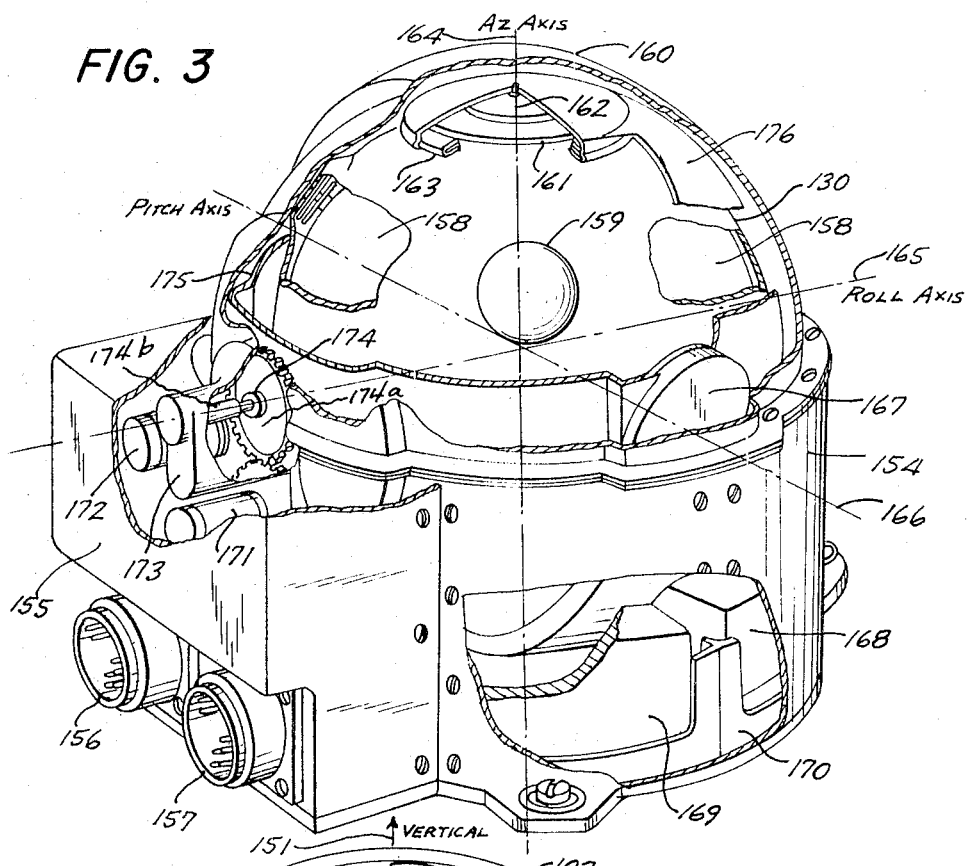
FIG. 3 is a side perspective view of the inertial unit, with the outer and inner housings partly broken away more clearly to show the interior construction.
Figure 4:
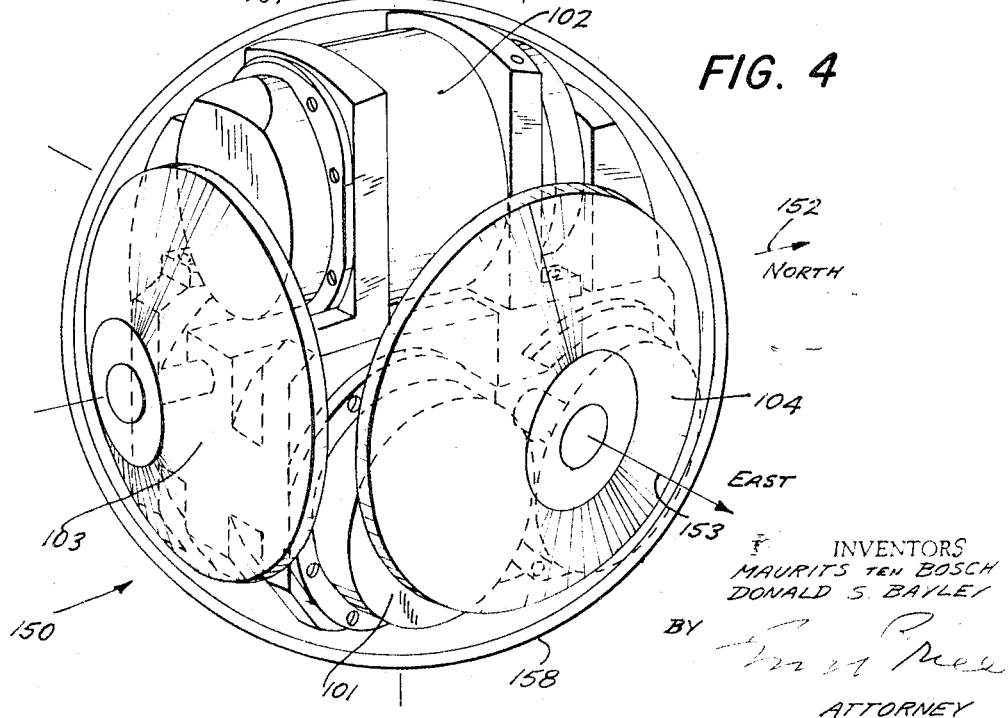
FIG. 4 is a side elevational view of the gyroscope and rotor elements, showing their assembly in the unit of FIG. 3.

In the alternative arrangement of FIGS. 2 to 4 there is shown a light weight inertial navigational system which has an inertial unit diagrammatically shown in FIG. 2 which may weigh as little as 21 pounds and have a volume of 365 cubic inches, together with a computer unit shown in FIG. 2a having a weight of about 6 pounds and a volume of about 160 cubic inches.

The basic outputs of the system of FIGS. 2 to 4 will be the north and east combinations of the vehicle position vector and the directional outputs will be the true heading and the orientation of the vehicle with respect to a supplied vertical.

The continuous output of latitude is also available from the computer, together with derived outputs including longitude, range and bearing to a destination.

The system will be provided with a continuous input consisting of the altitude above sea level measured to an accuracy of about 1,000 feet. The other inputs are the required setting for initial position and velocity.

The entire system of FIGS. 2 and 2a will be capable of rapid initial alignment on the ground or on a moving surface, airborne or underseaborne vehicle or transport.

Essentially, the system, as shown in FIG. 2, has a basic inertial unit with a pendulously supported platform 100 which carries an east-west gyroscope 101, a north-south gyroscope 102, east-west rotor 103, a north-south rotor 104 and an azimuth gyroscope 105.

The east-west gyroscope 101 is provided with an axis 106 having a torquer 107 at one side and a pickoff 108 at the other side.

The pickoff 108, through an amplifier 109, will supply a signal to the torquer 110 associated with the shaft 111 of the east-west rotor 103.

The east-west rotor 103 in turn is associated with a pickoff 112, which supplies a signal through the line 114 to the computer of FIG. 2a. The torquer 107 for the east-west gyroscope 101 in turn is supplied with a signal through the line 115 from the computing mechanism.

The north-south gyroscope 102 is provided with a torquer 116 and a pickoff 117 which supplies a signal to the amplifier 118, which in turn supplies electrical signal to the torquer 119 of the north-south rotor 104.

Associated with the shaft 120 at the other side of the north-south rotor 104 is the pickoff 121. This pickoff, through the line 122, will supply a signal to the computer of FIG. 2a.

The torquer 116 of the north-south gyroscope 102 in turn will receive a signal through the connection 123 from the computer of FIG. 2a.

In respect to the azimuth gyroscope 105, the pickoff 124 associated with the shaft 125 will send a signal outwardly through the amplifier 126 and the connection 127 to the computer of FIG. 2a.

In turn, the torquer 128 of the aximuth gyroscope will receive a signal through the line 129 from the computer of FIG. 2a.

The platform 100 will be supported inside of the phantom gimbal 130, which is associated with the torquers 131, 132 and 133.

The torquer 131 receives a signal through the line 134 from the junction 135 on the line 127 beyond the amplifier 126.

A branch connection 136 will supply a signal to the torquer 132. The torquer 133 will receive a signal from the computer circuit through the line 137.

The inertial unit, as shown diagrammatically in FIG. 2 and in greater detail in FIGS. 3 and 4, will contain a gyroscope compass seeking true north and it will be independent of any reference to a magnetic compass and will have an undamped natural period of about 8 minutes and a critical damping ratio of 50% with an accuracy of about 1 minute of an arc.

The gyroscope unit indicated diagrammatically at 150 in FIG. 2 is shown in greater detail in FIG. 4 and it has a vertical axis 151, a north-south axis 152 and an east-west axis 153. The north-south gyroscope 101 and the east-west gyroscope 102 are positioned in superimposed relationship in the gyrosphere 150.

The east-west rotor 103 and the north-south rotor 104 are positioned alongside of the superimposed east-west and north-south gyroscopes 101 and 102. The enclosure shell is diagrammatically indicated at 158.

This gyrosphere 150 is included in the main housing 154 shown partly broken away in FIG. 3, with an extension housing 155 having the plug-in members 156 and 157.

The shell 158 in FIG. 3 is enclosed inside of the phantom gimbal 130 on which are mounted the lead housings 159 (see FIG. 3).

Between the phantom 130 and the gimbal housing 160 are positioned the slip rings 161, the roll pickup 162 and the ring type servo and resolver 163. The azimuth axis is indicated at 164, while the roll axis is indicated at 165 and the pitch axis is indicated at 166.

The pitch servo synchro slip ring assembly 167 is positioned at the side of the housing 153. The electronic combinations are positioned in the containers 168 and 169 inside of the supporting framework 170 (see FIG. 3). The roll synchro 171 is positioned in the housing 155, alongside of the roll servo 172.

The brush housing 173 is positioned outside of the slip rings 174.

The roll gimbal 175 is positioned outside of the pitch bimbal 176, which in turn encircles the phantom gimbal 130.

The inertial unit of FIGS. 3 and 4 will contain an extremely compact arrangement, the two vertical gyroscopes 101 and 102, the azimuth gyroscope 105 and the compensating rotors 103 and 104, and it is floated by natural buoyancy in a low viscosity lubricating fluid.

It will be positioned in respect to the servo controlled gimbals 175 and 176 by electrostatic forces and it is made pendulous by locating its center of gravity slightly below its center of buoyancy.

Referring to FIG. 2, the distance at which the center of gravity is positioned below the center of buoyancy to give pendulosity is measured by the pendulous moment and this pendulosity, together with the gyroscope stability and the precession torquers 107 and 116, will hold the gyrosphere G or 150 horizontal.

The gyrosphere 150 or G is north-seeking through the action of the azimuth gyroscope 105, while the phantom gimbal G' or 130 is servo stabilized in roll, pitch and azimuth against the gyrosphere G.

The phantom gimbal G' or 130 is driven in azimuth by an azimuth servo.

Referring to FIG. 2a, there is shown the same connections as led into and out of the gyrosphere arrangement of FIG. 2, namely 114, 115, 122, 123, 127, 129 and 137. In this arrangement, the Schuler tuning correction will be fed to the torquer 107 through the line 115 from the multiplier 200, which will multiply the rate of change of longitude by the angular momentum of the gyroscope.

Into the multiplier 200 is fed the angular momentum of the vertical gyroscope at 201, together with the east-west velocity at 202, including computation giving a correction for the rotation of the earth.

The information supplied through the line 114 from the pickoff 112 of the east-west rotor to the instrument 203 will give the differential value of the east-west position, divided by the distance to the center of the earth, which in turn gives the east-west speed, divided by the distance to the center of the earth to equal the angular velocity, which is the rate of change of longitude, plus the earth's rate of rotation, multiplied by the cosine of latitude.

These operations will take place in the instruments 204 and 205 to give the information supplied by the branch connections 206 to the line 202. The signal then supplied to the junction 207 will be zero.

If an error signal is supplied to the junction 207, it will drive the motor 208 at a rate proportional to the change of longitude, which in turn, through the differential and in turn through the instrument 209, will actuate the longitude counter or indicator 210.

The resolver 211 receives a signal from the instrument 212, which receives a signal 213 giving the earth's rotation, which in turn is supplied from the electrical differential 214 from the junction 215. The information supplied at 215 will be the angular velocity or change of longitude, plus the earth's rate of rotation.

The latitude resolver 211 receives the latitude information through the line 216 and in turn will supply information at 217, which is the negative of the angle of velocity or change of longitude, plus the earth's rate of rotation times the cosine of the latitude.

Through the line 218 will be supplied information concerning the angular velocity or change of longitude, plus the earth's rate of rotation, times the sine of the latitude.

The information 122 from the pickoff 121 of the north-south rotor will pass through the instrument 219, which is an electric differential, where north-south velocity will be divided by the distance to the center of the earth to give the rate of change of latitude.

This information is then fed through the instrument 220 to the junction point 221, from which it passes through the line 222 to the amplifier 223 to the latitude motor 224.

The latitude motor 224 supplies information to the pulser differential 225 from the junction 226, where it passes to the resistance 227 which feeds the electric signal reversely equal and opposite the electrical signal, which is fed through the resistances 228 to the junction point 229.

If there is no error signal at the junction point 229, the motor will not turn.

The differential 230 will have a connection 231, by which it is possible to set in the initial latitude.

The second latitude resolver 232 supplies information concerning the cosine of the latitude to the altitude correction computer 233 by the line 234. Into the altitude correction computer is fed information in respect to the altitude at 235 and the rotation of the earth 236, so that the information supplied at 237 will give correction for the oblateness of the earth and the altitude above the surface of the earth.

The latitude resolver at 232 also supplies information through the connection 238, which is the sine of the latitude to the differential 239, which then drives the latitude computer 240 through the shaft 241.

From the junction 242 the information concerning latitude is supplied from the instrument 230 and the motor 224. The correction which is supplied at 237 will correct for the oblateness of the earth, which is about 12 to 13 miles at the equator.

The line 127, which takes the azimuth signal from the pickoff 124 will pass through the resistance 243, the amplifier 244 and the motor 245. The error signal at the junction 246 will drive the motor 245.

From the motor 245 the information passes to the junction 247 and at the line 248 to the differentiater 249 and to the resistance 250, which acts in an opposite direction to the signal passing through the resistance 243, so that when they are equal and opposite they will cancel each other at the point 246.

The differential 251 will receive information from the junction 252 through the line 253 and supply it through the line 254 and back through the line 137 to the torquer 133.

Referring to the gyrosphere arrangement as shown in FIGS. 3 to 14, the gyrosphere may be preferably made of a beryllium structure having a total weight of about 31 pounds and a volume of about 550 cubic inches.

Spherical housing 158 will enclose the two vertical east-west and north-south gyroscopes 101 and 102, the azimuth gyroscope 105 and the compensating east-west rotor 103 and north-south rotor 104.

The entire gyrosphere is floated at neutral buoyancy in a low viscosity inactive fluorinated organic solvent, the viscosity of which will not change with varying temperature.

It is positioned in respect to servo control gimbals by electrostatic forces.

The entire gyrosphere unit 158 is made pendulous by locating its center of gravity slightly below its center of buoyancy.

Each vertical gyroscope 101 and 102 is used both as a stable reference and is an integrating accelerometer.

The azimuth gyroscope 105 will operate as a gyrocompass and will provide true north as a stabilized reference direction.

The compensating rotors 103 and 104 store the velocity information obtained from the vertical gyroscope, and the speeds of these rotors measure the vehicle velocity components and their total revolutions measure the position components.

The gyrospheric reactions automatically induce corrections for the Coriolis and centripetal accelerations.

The combined action of the three gyroscopes 101, 102 and 105 and the two rotors 103 and 104 results in a completely stabilized gyrosphere 100 with outputs that are double integrals of the horizontal components of the acceleration of the vehicle.

The stable vertical reference thus provided is completely independent of acceleration, velocity and rotation of the earth, and its direction is that of true gravity, namely, the direction that would be assumed by a stationary plumb bob if the earth were not rotating.

The oscillation of the gyrosphere 158 with respect to the vertical reference will have amplitudes of about 20 seconds of arc and a period of about 84 minutes.

The north reference will have an accuracy given by the formula $\phi/\cos L$, where $\phi$ equals about one minute of arc and L is the latitude of the vehicle.

The oscillations of the gyrosphere 158 about the north reference will be damped.

The undamped period will be about eight minutes and the critical damping ratio about one-half.

The largest torque which must be applied between the gyrosphere and its supporting structure is very small, less than .01 in. oz.

Together with the flotation, this feature makes possible the use of an extremely lightweight structure for the servo driven external gimbal system shown in FIG. 3.

The fluorinated neutral low viscosity organic liquid which acts as the flotation liquid is contained in the space between the gyrosphere 158 and the gimbal housing 160 as shown in FIG. 3.

To maintain neutral buoyancy, the temperature of the gyrosphere 158 is controlled to about + or − 1° F., and the temperature control may be maintained by thermostats and film type heaters on the interior wall or surface of the gimbal housing 160.

Surrounding the gyrosphere 158 at a spacing of 1 mm. is the thin spherical shell of beryllium which forms the phantom 130, and this phantom is perforated to permit the flotation liquid to flow therethrough, but at the same time the gyrosphere 158 should be protected from currents in the flotation liquid caused externally of the phantom gimbal 130 by the movement of the pitch gimbal 176 and the roll gimbal 175.

Mounted on the phantom 130 are the pickoffs, such as 162 in FIG. 3 which measure the relative displacement and rotation between the phantom 130 and the gyrosphere 158.

The displacement outputs from the pickoffs, such as 162, are used as error signals for controlling the electrostatic forces that hold the gyrosphere centered in respect to the phantom 130.

The relative rotation outputs of the pickoffs, 108, 117 and 124 as shown in FIG. 2 are used as error signals, for the roll servo 172, azimuth servo 163 and pitch servo 167 in FIG. 3.

These servos 172, 163, and 167 drive respectively the roll gimbal 175, the pitch gimbal 176 and the phantom gimbal 130, and hold at null the relative rotation between the gyrosphere 158 and the phantom gimbal 130 of FIG. 3.

The roll and pitch gimbals 175 and 176 are thin, light sphericals of beryllium and their densities are such that they will be the same as that of the inert flotation liquid, and they will be streamlined to reduce the servo power requirement.

Slip rings 161 for the azimuth connection, 174a and 174b for the roll connections and 167 for the pitch connections will make the necessary electrical connections across the axes of the gimbals, and these slip rings may consist of low torque hair springs to provide all the necessary electrical connections between the phantom 130 and the gyrophere 158.

Each of the gyroscopes 101, 102 and 105 are also held in sealed housings, and they may be mounted in beryllium gimbals with their rotors and having angular momentum of about 2.55 million gm. cm.$^2$/sec.

Each gimbal structure includes a sealed housing which allows the assembly to be floated at nearly neutral buoyancy.

The same inert fluorinated organic liquid will fill the space between the sealed gimbal assembly and the external housing of each gyroscope.

Figure 5:
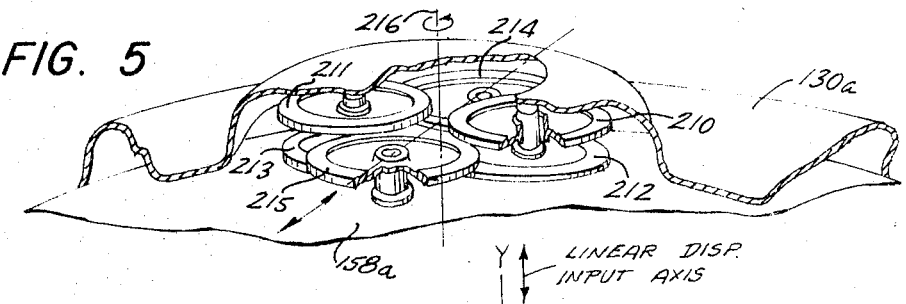
FIG. 5 is a fragmentary top perspective view partly broken away to show the gyrosphere pickoff arrangement.

In FIG. 5 there is shown a typical gyrosphere pickoff which is positioned between the upper portion 158a of the gyrosphere shell and the upper portion 130a of the phantom shell.

Figure 6:
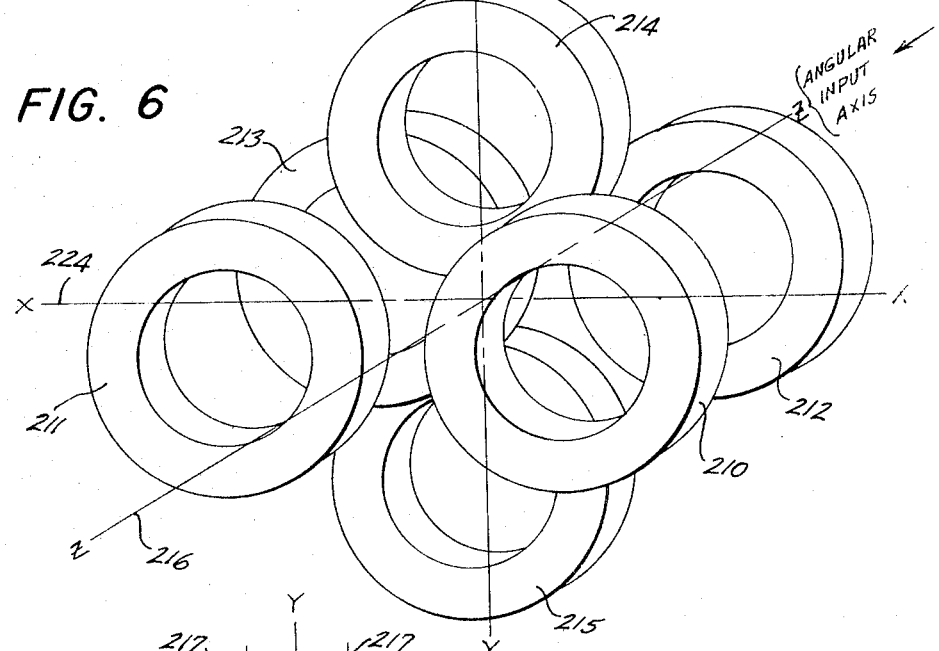
FIG. 6 is a diagrammatic perspective view illustrating the pickoff coil arrangement in respect to the input axes.
Figure 7:
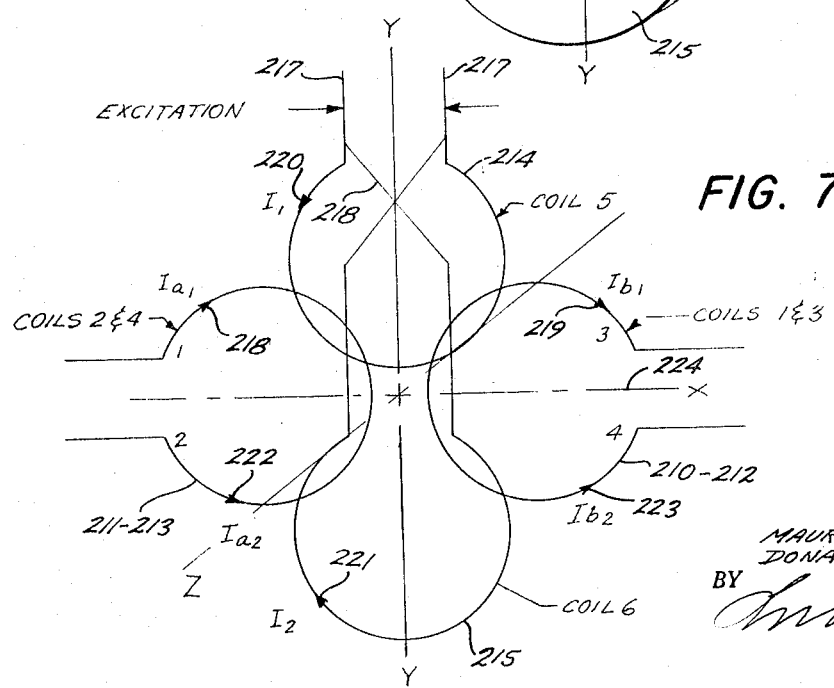
FIG. 7 is a diagrammatic layout of the pickoff circuit.

FIG. 6 shows the pickoff coil arrangement while FIG. 7 shows the circuit.

The pickoffs such as shown in FIGS. 5 to 7 will measure the relative orientation and position between the gyrosphere 158 and the phantom 130.

The actual pickoff consists of three pairs of coils arranged in the manner indicated in FIGS. 5 to 7 with one pair of coils laying in a common plane.

As shown in FIG. 6, the coil pairs 210–211, 212–213, and 214–215 are fixed parallel to each other with the coil pairs 210–211 and 212–213 being attached to the phantom shell 130a while the coil pairs 214–215 are fixed to the gyrosphere shell 158a.

The arrangement as shown in FIG. 5 illustrates the manner in which the coil pairs of FIG. 6 may be positioned between the gyrosphere shell 158a and the phantom shell 130a, and this pickoff arrangement may be repeated for each of the gyrosphere axes.

To make the output sensitive to the direction of rotation around the Z axis or angular input axis 216, the primary coils 214–215, are excited from an A.C. source 217 indicated in FIG. 7 and so that the generated fields are opposite to each other as indicated by the crisscross connection 218.

The secondary coils 211–213 and 210–212 as shown in FIG. 7 are connected in parallel pairs and in such a manner that rotation causes an addition of the induced currents.

In FIG. 7, the coils 210 to 215 are shown in null position with the movable primary coils 214–215 connected so that the connections of the generated fields are opposite to each other, and the pairs of secondary coils 210–212 and 211–213 are connected as a single loop for simplicity.

In the null position, the current 220 flowing in coil 214 in FIG. 7 will generate a current at the coils 210 to 213 as shown by the arrows 218 and 219.

The current 221 which flows in coil 215 will generate currents 222 and 223 in coils 210 to 213 but in opposite directions to the currents 218 and 219.

Because of the equal coupling of the coils in null position, the induced currents in the secondary coils 210 to 213 are equal and opposite and, therefore, cancel out.

However, the voltage output of each pair of the secondary coils 210 to 213 will supply the necessary information for detection of rotation about an axis perpendicular to and a displacement along, the axis parallel to the plane of coils indicated at 224 in FIG. 6.

The axis 224 in FIG. 6 may be considered to be the pitch axis 166 in FIG. 3 while the axis 216 in FIG. 6 may be considered to be the vertical axis 164 or the azimuth axis 164 in FIG. 3.

The pickoffs, such as shown in FIGS. 5 to 7, which will be positioned at each of the three axes of FIG. 3, namely, the vertical azimuth axis 164, the roll axis 165 and the pitch axis 166 will give all the rotation and displacement measurements required.

For example, with the vertical axis 216 of FIGS. 5 to 7, the pickoff as shown in FIG. 5 will give the rotation about the vertical axis 216 and the displacement about the roll axis 165 of FIG. 3.

During the rotation, the induced currents in the coil pairs 210–212 will be out of phase with the induced current in the coil pair 211–213.

For the displacement, on the other hand, along an axis, the induced currents will be in phase either positive or negative depending on the direction of motion.

Therefore, the difference signals represent rotation, and the sum represents displacement.

Proper output signals will be obtained by connecting the secondary coils 210 to 213 of the pickoff to the primary of a transformer and extracting the sum and difference signals by proper connection of the transformer's secondaries.

Since this transformer arrangement forms no part of the invention, it is not either shown or described herein.

Figure 8:
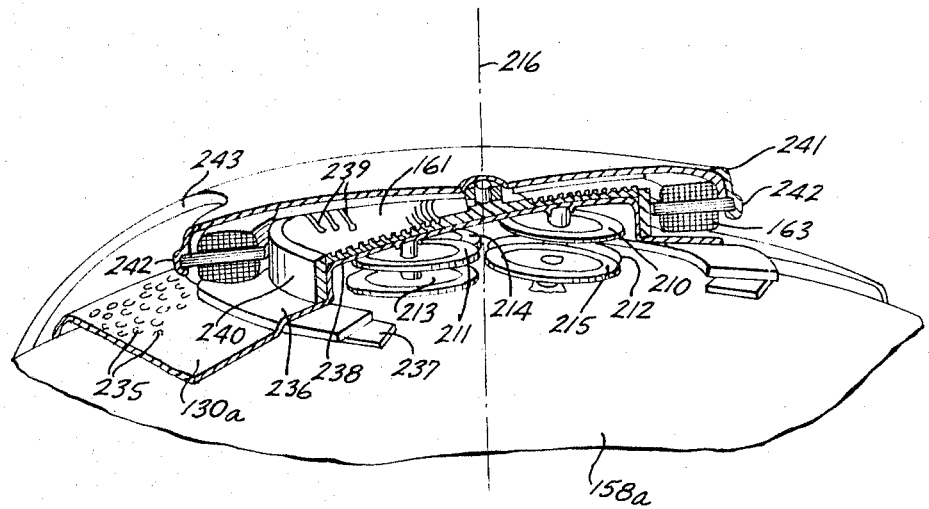
FIG. 8 is a fragmentary top perspective view showing the azimuth axis assembly.

Referring to FIG. 8, there is shown the azimuth axis assembly.

This axis assembly indicated at 216 in FIGS. 5 to 7 or 164 in FIG. 3 extends vertically.

As indicated in FIG. 8, there is shown the upper gyrosphere shell 158a, the pickoff coils 210 to 215 which are positioned between the upper phantom shell 130a and the gyrosphere 158a.

In FIG. 8, there are shown a series of openings at 235 in the shell 130a which permit flow of the inert flotation liquid across the phantom shell 130a.

In a ridge 236 at the phantom shell around the axis 216 are positioned the electrostatic centering electrodes 237.

The azimuth slip rings 161 may be mounted on top of the dome 238 on the phantom shell 130a.

The spring leaf contacts 239 will ride on the azimuth slip rings 161.

The structural ring 240 will encircle the dome 238 and in turn be encircled by the azimuth ring type servo and resolver 163 which will be held in position by means of the shell structure 241 with the depending clip member 242.

The azimuth gimbal portion 243 as shown in FIG. 8 will carry the azimuth ring type servo and resolver through the elements 241 and 242.

The arrangement shown in FIG. 8 will give electrostatic centering of the gyrosphere with respect to the phantom shell 130.

The electrostatic centering electrodes 237 will be arranged, concentrically around the pickoff coils 210 to 215.

The radial and rotational signals from the gyrosphere pickoff 210 to 215 as indicated diagrammatically in FIGS. 5 to 7 will produce the electrostatic centering forces to be applied to centering electrodes 237.

Figure 9:
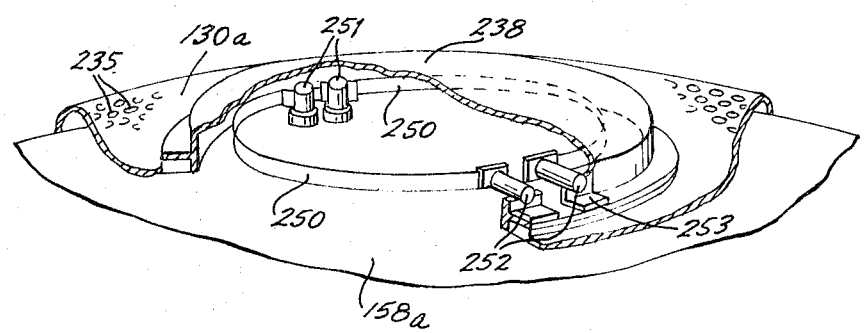
FIG. 9 is a fragmentary top perspective view showing the electrical leads to the phantom gimbal.

FIG. 9 illustrates the electrical leads from the gyrosphere 158a to the phantom shell 130a.

As indicated within the dome 238 on the phantom shell 130a, the semi-circular leaf spring members or flexible leads 250 may be connected between the posts 251 mounted upon the gyrosphere shell 158a, and the laterally extending studs 252 which contact the angle members 253 mounted upon the phantom shell portion 130a.

The elements 250 consist of semi-circular leaf springs positioned symmetrically around the gyrosphere and mutually perpendicular to the gyrosphere axes.

These semi-circular leaf springs will not affect the flotation nor balancing of the gyrosphere and the encircling shells, and the center of buoyancy will remain at the center of the gyrosphere with the acceleration reaction moments canceling.

All of the electrical leads between the outside housing 160 and the phantom 130 cross the roll axis 165, the pitch axis 166 and the azimuth axis 164 (see FIG. 3).

These axes are servo driven, and it is not necessary that the frictional torques be reduced to minimum values as is the case for the inner gimbal axes, and the gyroscope tilting axes.

The various electrical connections, therefore, may be brought or made across the outer gimbal axes by slip rings and spring wire brushes as is indicated, for example, at 167, 174a, 174b and 161 in FIG. 3.

Figure 10:
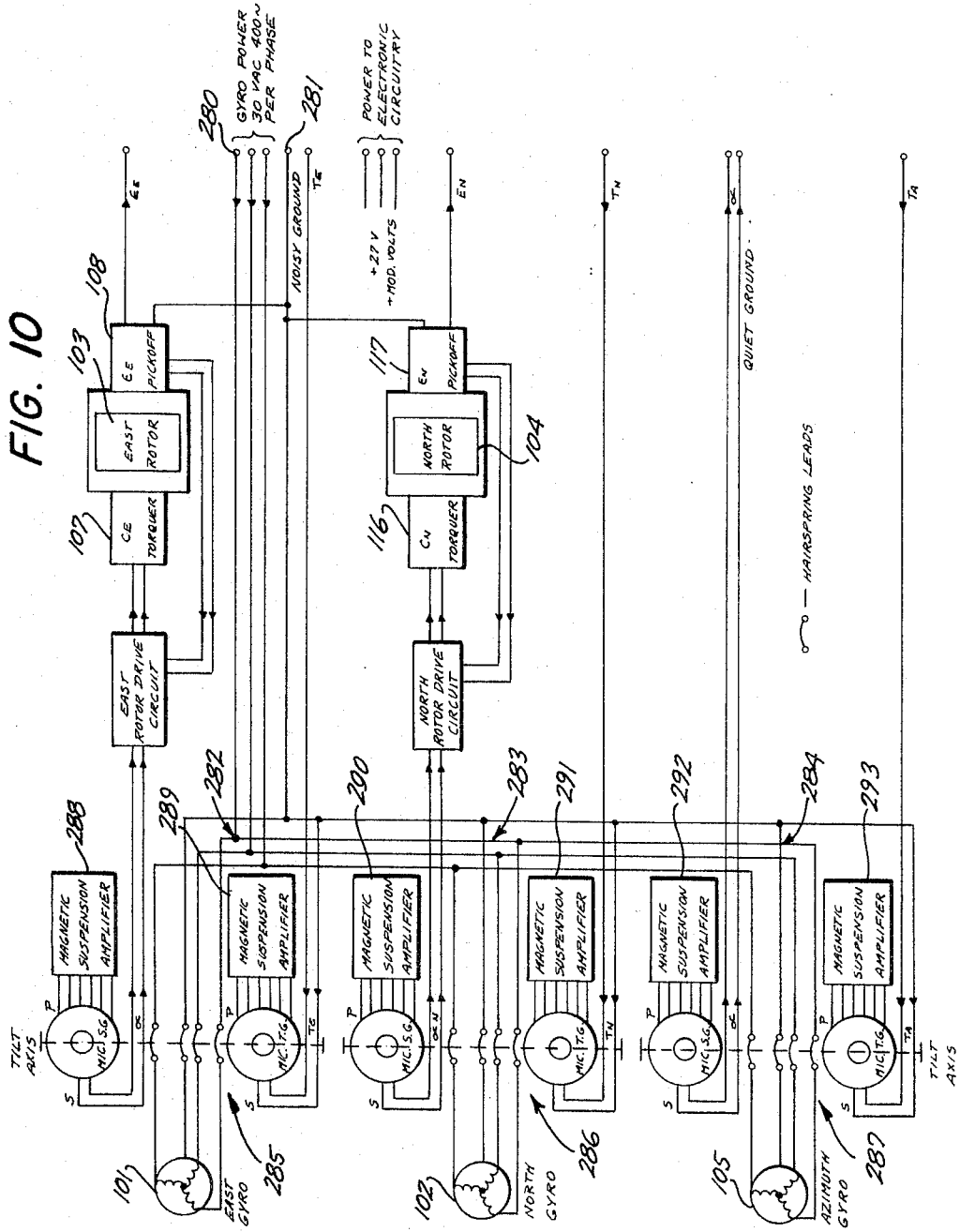
FIG. 10 is a diagrammatic electrical diagram showing the connections to the gyrosphere.

The general electrical arrangement is best shown in FIG. 10.

There is indicated in FIG. 10, the east-west gyroscope 101, the north-south gyroscope 102 and the azimuth gyroscope 105 together with the east-west rotor 103 and the north-south rotor 104 (see also FIG. 2).

The rotors 103 and 104 are each provided with a torquer 110 and 119 and with pickoffs 112 and 121.

The required electrical leads as shown in FIG. 10 include three power leads 280 for the three phase gyroscope motors plus a ground lead 281 to the gyroscope casings.

These leads are branches at 282, 283 and 284 to each gyroscope.

The branch leads are brought across the tilting axes of each gyroscope by four hair spring type bands indicated at 285, 286 and 287, which bands are arranged semi-circularly in a plane perpendicular to the tilting axes as is indicated in FIG. 9.

Each of the gyroscopes are provided with electromagnetic suspension amplifiers as indicated at 288, 289, 290, 291, 292 and 293.

Referring to FIGS. 11 to 14, there is shown the detailed construction of the gyrosphere and its housings.

Basic structures include a central platform 320 on the top of which is mounted the north-south gyroscope 102 and below which is mounted the housings 101 for the east-west gyroscope and 105 for the azimuth gyroscope.

This central platform has recesses as indicated at 321 and 322 for receiving the east-west gyroscope structures, and the north-south gyroscope structure 105.

At the sides, there is positioned the east-west rotor 103 and the north-south rotor 104.

Figure 11:
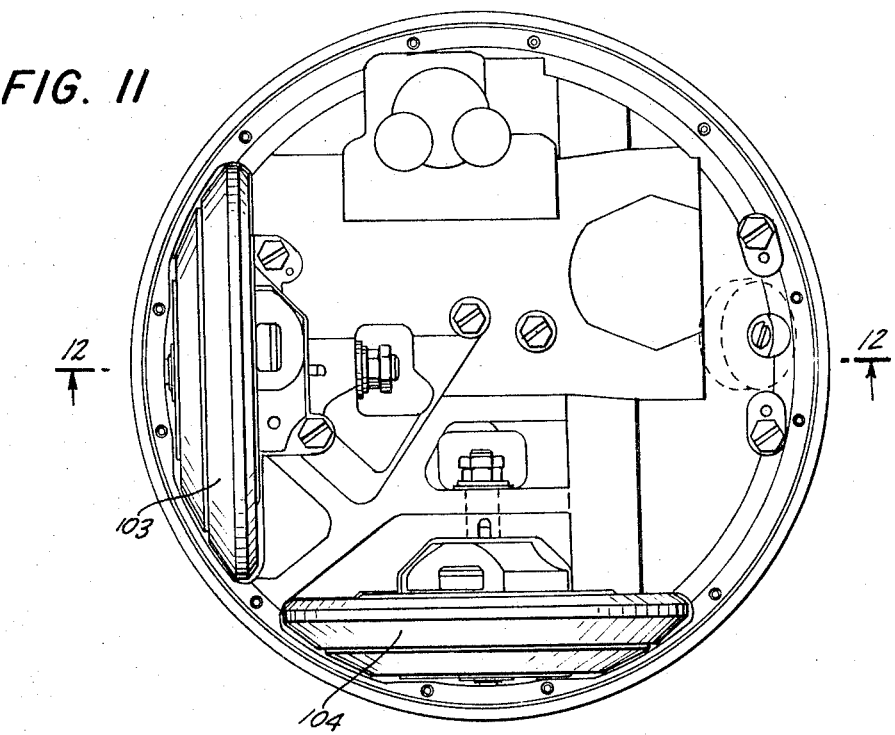
FIG. 11 is a top plan of the gyroscope mounting together with the north-south and east-west rotors as shown in position in their casings.
Figure 12:
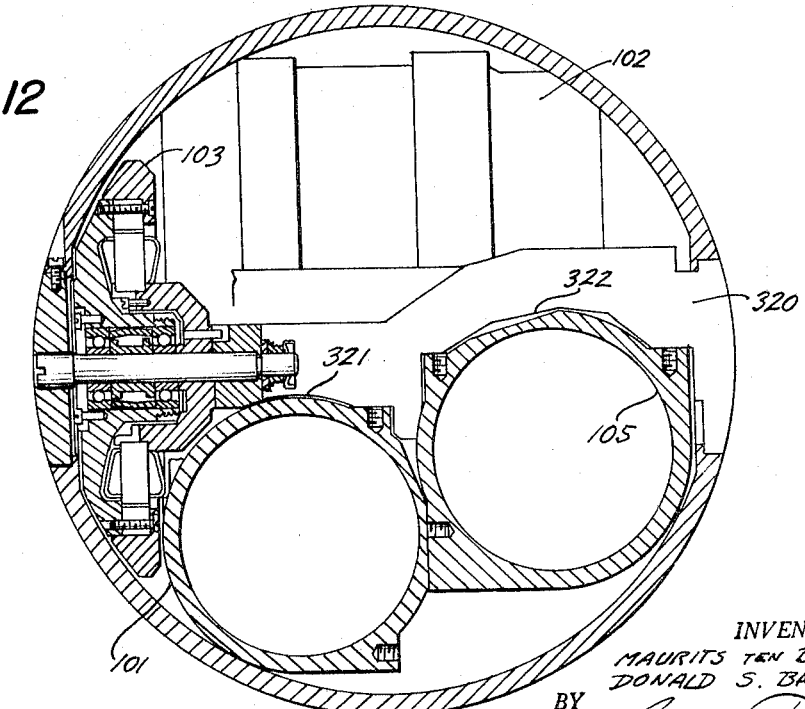
FIG. 12 is a transverse sectional view taken upon the line 12—12 of FIG. 11 showing the position of the rotor in respect to the gyroscope mountings.

These rotors conveniently fit into the spherical structure as shown in FIGS. 11 and 12 with maximum of space economy.

In the structure as shown in FIGS. 11 and 12, the main support structure 320 may be made of beryllium with the flotation liquid consisting of a fluorinated solvent such as trifluorochloroethylene or polymers of trifluorovinylchloride.

Where a gas filling is necessary, it can be an inert gas such as a mixture of helium or nitrogen.

In the preferred arrangement, as shown in FIGS. 11 and 12, the east-west gyroscope is suspended at the lowest level, and the azimuth gyroscope is suspended alongside of the east-west gyroscope with its axes at a slightly higher level, and the longitudinal axes of both the east-west and azimuth gyroscopes are parallel.

The north-south gyroscope on the other hand is supported on top of the central or main structural platform 320 with its axis transverse to the axis of the east-west and azimuth gyroscope.

The axis of the east-west rotor as shown in FIG. 12 will be parallel to the axis of the north-south gyroscope 102 and transverse to the axis of the east-west and azimuth gyroscopes 101 and 105.

On the other hand, the axis of the north-south rotor as indicated in FIG. 11 is transverse to the axis of the east-west rotor 103 and is parallel to the axis of the east-west gyroscope 101 and the azimuth gyroscope 105.

Figure 13:
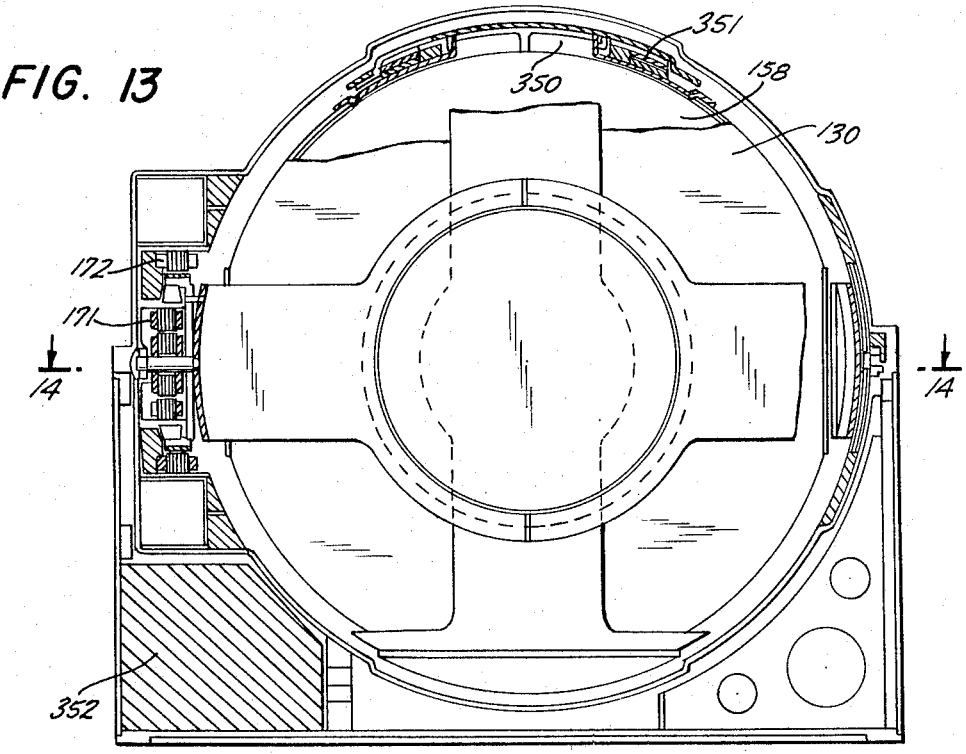
FIG. 13 is a transverse sectional view of the complete unit showing the gyrosphere in the outer housing.

In the housing structure as shown digrammatically in FIG. 13, the phantom 130 encloses the gyrosphere 158.

The roll and pitch pickoffs may be located at position 350 in FIG. 13, and the azimuth servo arrangements may be located at 351.

Figure 14:
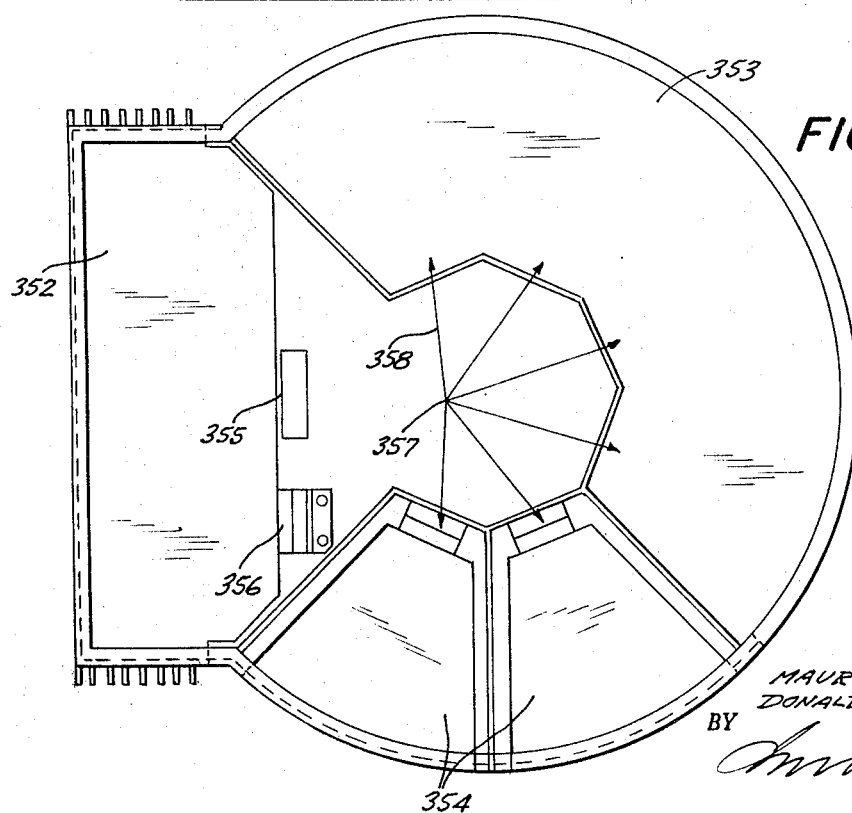
FIG. 14 is a transverse sectional view with the gyrosphere housing removed and taken upon the line 14—14 of FIG. 13.

The gyro power supply may be located at 352 in FIGS. 13 and 14.

The roll servo mechanism 172 and the roll synchro mechanism 171 are both located at the left of the housing as shown in FIG. 13.

In FIG. 14, there is diagrammatically indicated the layout of the auxiliary equipment.

Servo amplifiers may be positioned in the space indicated at 353 with the high voltage amplifiers being positioned in the spaces 354.

The gyroscope housing connecters may be positioned at 355, and the gyro power supply connecter at 356.

The servo amplifier and the high voltage amplifier connections are indicated at 357, and they have leads indicated at 358 directed toward the various amplifier units.

The present invention is directed essentially to the provision of a common platform carrying the three gyroscopes and two rotors, and is not directed to the details of the various constructions which are diagrammatically indicated in FIGS. 3 to 14.

The essential feature of the present invention is indicated in FIG. 2, where there is a common horizontal platform carrying the two rotors and three gyroscopes with an outside phantom gimbal in turn encircled by or enclosed within a pitch gimbal and a roll gimbal all of which are enclosed in the gimbal housing.

As many changes could be made in the above lightweight inertial navigation system and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a lightweight inertial navigation system for aircraft and other moving vehicles to give longitude and latitude positions, a unit comprising a single platform carrying the east-west, north-south and azimuth gyroscopes and east-west and north-south rotor members, a phantom gimbal enclosing and encircling said platform and pitch and roll gimbals carrying said phantom gimbal and a housing enclosing the unit.

2. In a lightweight inertial navigation system for aircraft and other moving vehicles to give longitude and latitude positions, a unit comprising a single platform carrying the east-west, north-south and azimuth gyroscopes and east-west and north-south rotor members, a phantom gimbal enclosing and encircling said platform and pitch and roll gimbals carrying said phantom gimbal and a housing enclosing the unit, said housing being filled with an inert low viscosity fluorinated hydrocarbon fluid.

3. In a lightweight inertial navigation system for aircraft and other moving vehicles to give longitude and latitude positions, a unit comprising a single platform carrying the east-west, north-south and azimuth gyroscopes and east-west and north-south rotor members, a phantom gimbal enclosing and encircling said platform and pitch and roll gimbals carrying said phantom gimbal and a housing enclosing the unit, each of said gyroscopes and rotor members being provided with a torquer and pickoff, and the pickoff of the east-west gyroscope being directly connected to the torquer of the east-west rotor member and the pickoff of he north-south gyroscope being directly connected to the torquer of the north-south rotor member.

4. In a lightweight inertial navigation system for aircraft and other moving vehicles to give longitude and latitude positions, a unit comprising a single platform carrying the east-west, north-south and azimuth gyroscopes and east-west and north-south rotor members, a phantom gimbal enclosing and encircling said platform and pitch and roll gimbals carrying said phantom gimabal and a housing enclosing the unit, said single platform being pendulously suspended.

5. A lightweight inertial navigation system for determining latitude and longitude having a pendulously suspended horizontal platform, east-west and north-south gyroscopes having vertical spin axes mounted on said platform and east-west and north-south rotors having horizontal spin axes mounted at a right angle to each other, a phantom platform encircling and enclosing said pendulous platform, pick-offs associated with said gyroscopes to pick-off electrical information, amplifiers connected to said pick-offs to receive and amplify said electrical information, said rotors having field windings, and electrical connections from said amplifiers to said field windings.

6. The system of claim 5, an outside spherical shell enclosing said gyroscopes and said phantom platform having a floatation liquid with about twice the density of water and means mounting said spherical shell on a vehicle, said phantom platform taking the form of a spherical inside shell and being mounted within said outside spherical shell.

7. The system of claim 5, said pendulously suspended platform also carrying an azimuth gyroscope.

8. The system of claim 5, electrostatic control means being positioned on the phantom platform.

9. The system of claim 5, gimbals mounting said phantom platform to provide three rotational degrees of freedom and servo-motors actuating the phantom platform and pick-offs actuated by the gyroscopes to receive electrical signals and said servo-motors being driven by said electrical signals.

10. A method of determining longitude and latitude by a light weight inertial navigation system of the type having a pendulously suspended common platform carrying north-south and east-west gyroscopes and north-south and east-west rotors actuated from the corresponding gyroscopes; which comprises supplying inputs giving the altitude above sea level, initial position, and initial velocity, obtaining the second integral of acceleration in north-south and east-west directions as electrical outputs from the speed of the rotors and using the electrical outputs derived from the speed of the rotors to give information required for navigation in a horizontal plane.

11. In a lightweight inertial navigation system for use in aircraft and missiles to give outputs of north and east components of aircraft position vector and directional outputs as to the true heading and orientation of the aircraft with respect to the vertical, a pendulously suspended common sensitive platform, east-west and north-south vertical gyroscopes rotatably carried by said platform, east-west and north-south compensating rotors rotatably carried by said platform, an azimuth gyroscope rotatably carried by said platform, horizontally disposed shafts at each side of each of the gyroscopes and the rotors to permit relative rotation, torquers and pickoffs associated with each of said gyroscopes and rotors, an outside phantom platform encircling and enclosing the common platform, electrical connections between said east-west gyroscope pickoff and north-south gyroscope pickoff and the torquers of said respective east-west and north-south rotors to change the rotational velocity thereof in accordance with the angle of precession of the gyroscopes and to restore the respective gyroscopes to their null positions through reaction against said platform and electrical connections from the rotor pickoffs to supply integrated acceleration information and an outside housing carrying a flotation liquid to float said sensitive platform inside of said phantom platform and inside of said housing.

12. The system of claim 11, platform torquers associated with the outside platform and located between the inside and outside platforms and electrical connections from the pickoff of said azimuth gyroscope to the platform torquers to actuate the same.

13. The system of claim 11, a spherical gyroscope shell forming said common platform and enclosing the gyroscopes and rotors and said flotation liquid being inert and serving to float said shell and being contained in said outside enclosure.

14. The system of claim 11, said common platform taking the form of an inside shell and said outside platform taking the form of an outside shell, and gimbals carrying said outside shell giving said shell three rotational degrees of freedom.

15. The system of claim 11, said platforms consisting of inside and outside shells and said liquid consisting of a halogenated non-aqueous organic liquid having a specific gravity of about 2 and being located between the shells.

16. The system of claim 11, said common platform and gyroscopes carried thereby being arranged so that the center of gravity and the center of buoyancy of said sensitive platform in said flotation liquid are displaced from each other and the center of gravity being positioned below the center of buoyancy to give Schuler tuning.

17. The system of claim 11, said gyroscope torquers having electrical connections leading thereto to maintain the spin axis thereof in correction position in respect to the center of the earth.

18. The system of claim 11, said rotor torquers having control windings to change the speed of the rotors and the electrical connections between the respective gyroscopes and rotors including an amplifier.

19. The system of claim 11, electrical connections from the east-west rotor pickoff and a differential receiving electrical signals passing through said connection and in turn producing information corresponding to the cosine of latitude.

20. The system of claim 11, said gyroscopes being provided with double housings mounted on said platform and flotation liquid between said housings to float the gyroscopes.

21. The system of claim 11, said east-west and north-south gyroscopes being positioned in superimposed relationship and the east-west rotor and north-south rotor being positioned in side by side relationship to each other and to the gyroscopes.

22. The system of claim 11, said outside platform being provided with flow openings for the entire area thereof to permit the flotation liquid readily to flow therethrough.

23. The system of claim 11 in which the flotation liquid consists of a low viscosity lubricating fluid having a specific gravity of about 2.

24. A method of determining latitude and longitude and also true heading by a lightweight inertial navigation system of the type having a pendulously suspended common platform carrying north-south and east-west gyroscopes and north-south and east-west rotors actuated from the corresponding gyroscopes and also carrying an azimuth gyroscope which comprises supplying inputs including the altitude above sea level, initial position, initial velocity and aircraft true heading, generating electrical outputs which will give the true heading, orientation of the aircraft with such true vertical and the north-south, east-west components of the velocity of the true vertical and components of the latitude and longitude measured against the starting point required for navigation in a horizontal plane, said electrical outputs being derived from the speed of the rotors and from the azimuth gyroscope.

25. A method of determining longitude and latitude by a lightweight inertial navigation system of the type having a pendulously suspended common platform carrying north-south and east-west gyroscopes and north-south and east-west rotors actuated from the corresponding gyroscopes, which comprises supplying inputs giving the initial position, initial velocity and initial altitude above sea level, using the north-south and east-west gyroscopes to supply electrical outputs to the rotors consisting of the first integral of the acceleration, using the rotors to supply electrical outputs, which are the second integrals of the acceleration, and thereby obtaining the actual displacement in latitude and longitude and feeding inputs to the east-west and north-south gyroscopes to keep their spin axes at all times directed toward the center of the earth.

26. The method of claim 10, using an azimuth gyroscope to supply the aircraft true heading and supply an input to said azimuth gyroscope, which is the initial true heading.

27. In a lightweight inertial navigation system for use in aircraft and missiles to give outputs of north and east components of aircraft position vector, a pendulous common sensitive platform, east-west and north-south vertical gyroscopes rotatably carried by said platform, east-west and north-south compensating rotors rotatably carried by said platform, horizontally disposed shafts at such side of each of the gyroscopes and the rotors to permit relative rotation, torquers and pickoffs associated with each of said gyroscopes and rotors, an outside housing enclosing the common platform, electrical connections between said east-west gyroscope pickoff and north-south gyroscope pickoff and the torquers of said respective east-west and north-south rotors to change the rotational velocity thereof in accordance with the angle of precession of the gyroscopes and to restore the respective gyroscopes to their null positions through reaction against said platform and electrical connections from the rotor pickoffs to supply integrated acceleration information.

28. The system of claim 27, a spherical gyroscope shell forming said common platform and enclosing the gyroscopes and rotors and said housing containing an inert liquid to float said shell.

References Cited by the Examiner

UNITED STATES PATENTS

| | | | |
|---|---|---|---|
| 1,501,886 | 7/1924 | Abbot | 74—5.34 X |
| 1,743,533 | 1/1930 | Davis | 74—5 X |
| 2,109,283 | 2/1938 | Boykow | 74—5.37 X |
| 2,577,313 | 12/1951 | Downing | 74—5.34 |
| 2,854,850 | 10/1958 | Braddon | 74—5 |
| 3,005,352 | 10/1961 | Claret | 74—5.34 |

FRED C. MATTERN, Jr., *Primary Examiner.*

BROUGHTON G. DURHAM, *Examiner.*

T. W. SHEAR, P. W. SULLIVAN, *Assistant Examiners.*